(12) United States Patent
Perumana et al.

(10) Patent No.: US 8,768,270 B2
(45) Date of Patent: Jul. 1, 2014

(54) HIGH LINEARITY TX/RX SWITCH

(75) Inventors: Bevin George Perumana, Manteca, CA (US); Saikat Sarkar, Irvine, CA (US); Michael Boers, Sydney (AU)

(73) Assignee: Broadcom Corporation, Irvine, CA (US)

( * ) Notice: Subject to any disclaimer, the term of this patent is extended or adjusted under 35 U.S.C. 154(b) by 165 days.

(21) Appl. No.: 13/494,175

(22) Filed: Jun. 12, 2012

(65) Prior Publication Data

US 2013/0331043 A1     Dec. 12, 2013

(51) Int. Cl.
*H04B 1/44* (2006.01)

(52) U.S. Cl.
USPC .............. 455/78; 455/73; 455/83; 455/550.1; 455/39

(58) Field of Classification Search
USPC ................ 455/73, 78, 83, 550.1, 91, 130, 341
See application file for complete search history.

(56) References Cited

U.S. PATENT DOCUMENTS

| | | | |
|---|---|---|---|
| 2011/0051308 A1* | 3/2011 | Chan | 361/268 |
| 2011/0279184 A1* | 11/2011 | Chan et al. | 330/295 |
| 2013/0109331 A1* | 5/2013 | Lee et al. | 455/78 |

* cited by examiner

*Primary Examiner* — Tuan Pham
(74) *Attorney, Agent, or Firm* — Brinks Gilson & Lione

(57) ABSTRACT

A TX/RX switch includes a first switching device connectable with a power amplifier and a second switching device connectable with a low noise amplifier. Both the first switching device and the second switching device are operating in an ON state in transmit mode to provide substantial linearity including no significant alternating current signal swing across any two nodes of the first switching device and the second switching device in the ON state.

9 Claims, 7 Drawing Sheets

HIGH LINEARITY TX/RX SWITCH

TECHNICAL FIELD

This disclosure relates to transmit/receive switches for transceivers. More specifically the disclosure relates to transceiver switching circuits which can be highly linear in a transmit mode.

BACKGROUND

Transceivers in electronics and telecommunications are electronic devices which with an antenna produce and receive radio waves. The transceivers can generate a radio frequency alternating current, which can be applied to the antenna. When excited by the alternating current the antenna can radiate radio waves such as for communication purposes. A receiver of the transceiver can receive radio waves picked up by the antenna. A switch can alternate the transceiver between transmit and receive modes.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below references switching devices with transmit/receive (TX/RX) switches and exemplary topologies for the TX/RX switches. The TX/RX switches may select between transmit and receive modes of an antenna, such as in a mobile communication device. In TX/RX switch implementations with symmetric TX and RX paths, it can be difficult to achieve linearity in the transmit mode. Both ON, e.g., closed, and OFF, e.g., open, switching devices can be present during transmit mode, even in TX/RX switches with asymmetric TX and RX paths. The OFF, or open, devices can limit overall switch linearity, e.g., due to large voltage swings across the nodes of an OFF or open device. A low switch linearity can reduce the maximum power that can be transmitted by the transceiver leading to lower communication range (maximum possible distance between a transmitter and a receiver) and/or more stringent receiver specifications. Therefore, switching devices in the TX/RX switch are arranged to be in the ON, or closed, state in TX mode, and no switches are set to an OFF state during transmit mode. This can help ensure that there is no significant signal swing across any two nodes of the TX/RX switches to achieve high or substantial linearity.

Figure 1:
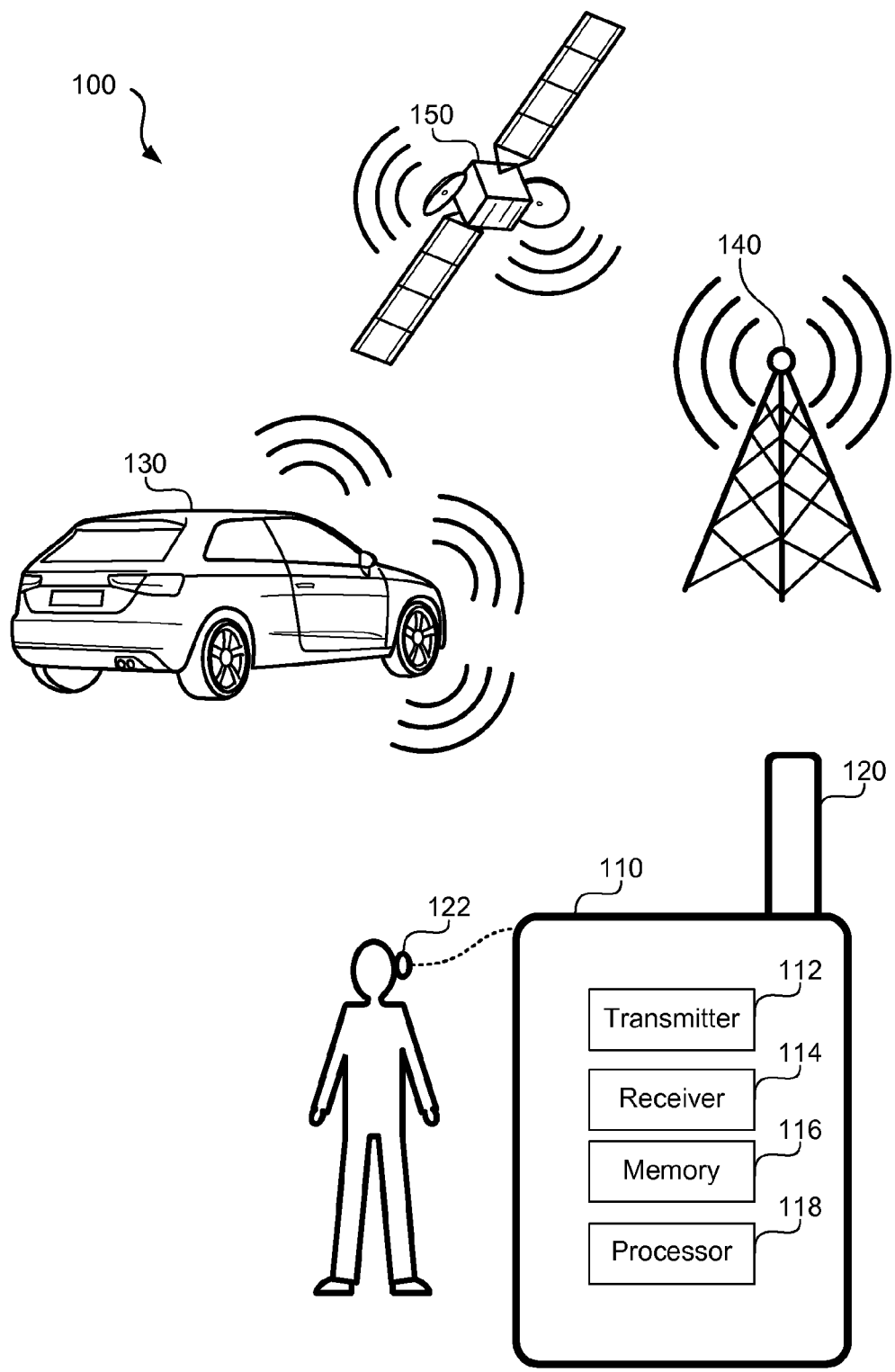
FIG. 1 is a block diagram of an exemplary communication environment.

FIG. 1 is a block diagram of an exemplary communication environment 100 that can utilize transceivers. For example, communication signals can be sent between endpoints. In one example, the endpoint is a communication device 110, such as a cell phone, personal digital assistant, tablet, portable email device, smartphone or a portable gaming system. The communication device can include a transmitter 112 and a receiver 114, e.g., a transceiver, a memory 116, a processor 118 and an antenna 120 to wirelessly exchange information, e.g., emails, text messages, radio, music, television, videos, video games, digital information, etc., with other endpoints. The communication device 110 may also wirelessly connect to a radio receiver or other audio device such as earpiece 122.

The communication environment 100 can also include other endpoints such as vehicles 130, including automobiles, aircraft, ships and spacecraft. The communication environment 100 can also include devices to provide a communication link between the endpoints such as cellular towers 140 and satellites 150. Transmitters 112 and receivers 114 sharing antenna 120 can also be component parts of many electronic devices that communicate by radio, such as wireless computer networks, Bluetooth enabled devices, garage door openers, radar sets, and navigational beacons. The antenna 120 may be enclosed inside a case or attached to the outside of the transmitter 112 or receiver 114 as in portable devices such as cell phones, walkie-talkies, and auto keyless remotes.

Figure 2:
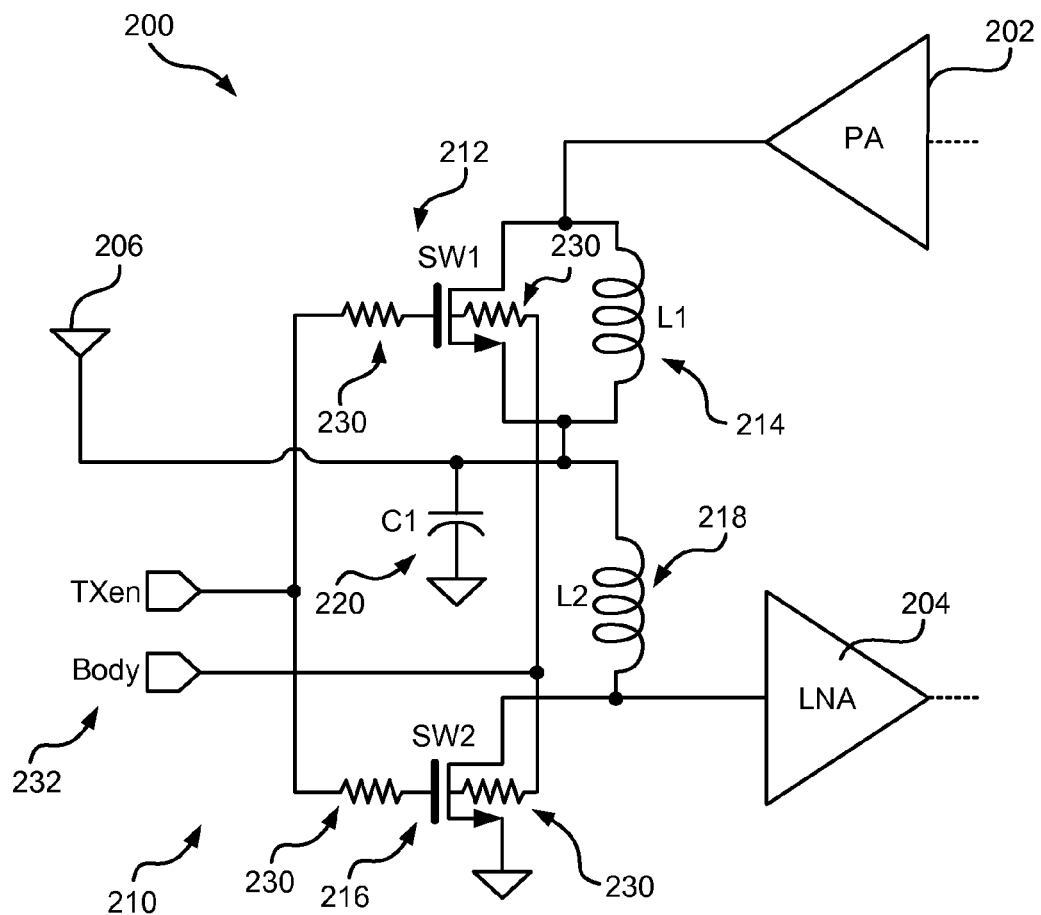
FIG. 2 is a circuit diagram of an exemplary TX/RX transceiver topology.

FIG. 2 is a circuit diagram of an exemplary TX/RX transceiver topology 200. The TX/RX transceiver topology 200 can be used for implementing the transmitter 112, receiver 114 and antenna 120 of FIG. 1. The TX/RX transceiver topology 200 can include an interface or transceiver switch 210 connectable with a power amplifier (PA) 202, a low noise amplifier (LNA) 204 and an antenna 206. The transceiver switch 210 can selectively switch between transmit and receive modes, e.g., switches between the PA 202 and LNA 204. In operation, the PA 202 can provide communication signals to the antenna 206 and the LNA 204 can receive communication signals from the antenna 206. The transceiver switch 210 includes a transmit signal path from the power amplifier 202 to the antenna 206 and a receive signal path from the antenna 206 to the low noise amplifier 204.

The transmit signal path can include a shunt resonance network and the receive signal path can include an L-network for impedance matching, e.g., for maximum power transfer. The matched impedances can include non-standard or standard impedances such as about 50Ω or about 75Ω. In one aspect, to implement the paths, the transceiver switch 210 can include switching devices, e.g., a first switching device (SW1) 212 and a second switching device (SW2) 216, and passive elements, e.g., a first inductor (L1) 214, a second inductor (L2) 218 and a capacitor (C1) 220. The first switching device 212 and the second switching device 216 can include series resistors 230 with the gate and body nodes 232 connected to AC ground. The gate can be connected to the TXen transmit enable signal to control opening and closing the first switching device 212 and the second switching device 216, e.g., to control turning ON and OFF the first switching device 212 and the second switching device 216.

The first switching device 212 and the second switching device 216 selectively provide signal path to/from the antenna to the PA 202 and to the LNA 204, respectively, for transmit and receive modes. The first switching device 212 and the first inductor 214 can connect in parallel between the antenna 206 and the PA 202. The second switching device 216 and the second inductor 218 can connect in series between the antenna 206 and ground, with the second switching device 216 connected to ground in parallel to the input of LNA 204. The capacitor 220 to ground connects to the first inductor 214 and the second inductor 218 to ensure impedance matching in both transmit and receive modes.

Figure 3:
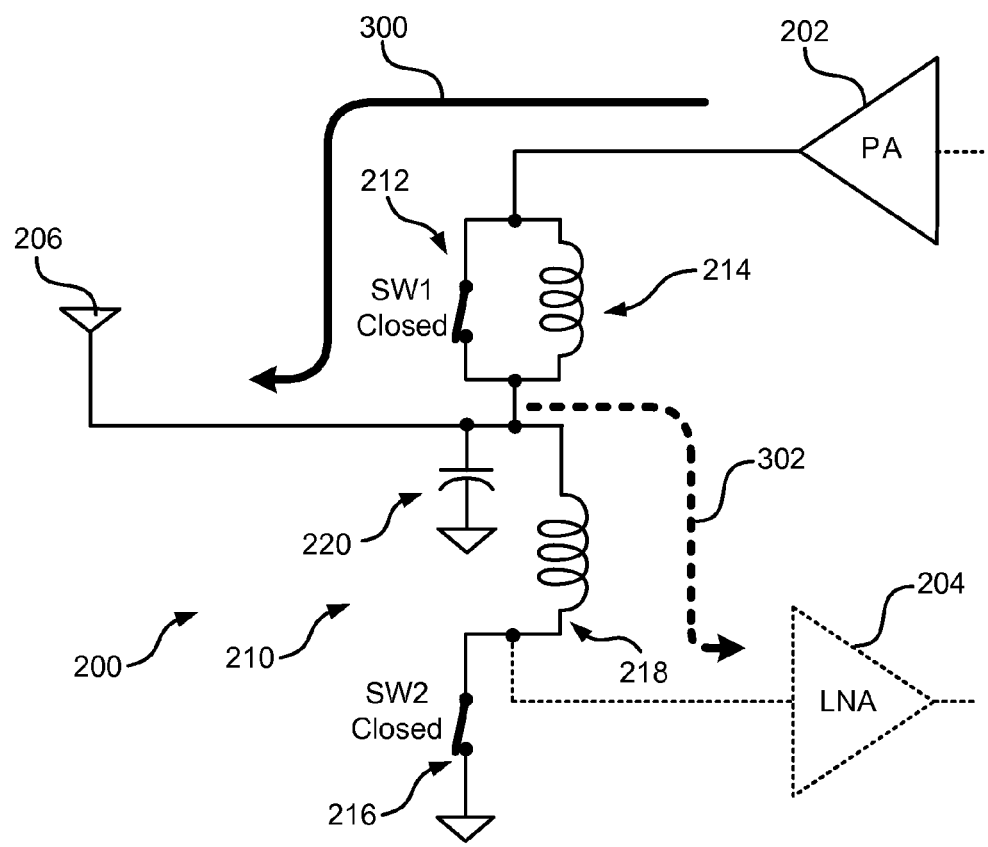
FIG. 3 is a circuit diagram of the exemplary TX/RX transceiver in transmit mode.

FIG. 3 is a circuit diagram of the exemplary TX/RX transceiver topology 200 in transmit mode. For purposes of explanation, the first switching device 212 and the second switching device 216 can include N-type metal oxide semiconductor (NMOS) transistors. In the transmit mode, the first switching device 212 and the second switching device 216 are closed, e.g., in an ON state, and no switching devices connected with the PA 202 and LNA 204 in the TX/RX transceiver topology 200 are set to an OFF state during transmit mode. With the first switching device 212 and the second switching device 216 set to an ON state, the source, drain, gate and bulk nodes of either of the switching devices 212, 216 can swing together, leading to a linear transmit mode, such as described in FIG. 4.

In the transmit mode of FIG. 3, the first inductor 214 is bypassed by the closed (ON state) first switching device 212 in the transmitter path 300. Therefore, the PA 202 can output power to the antenna 206 with minimum power loss. In this mode, the closed (ON state) second switching device 216 shorts both the LNA input and the second inductor to ground. The second inductor 218 resonates with capacitor 220 and ensures about no power can be lost to the LNA 204 through path 302. Other TX/RX switch architectures can be implemented that include all devices in the ON state in the transmit mode to provide linearity.

Figure 4:
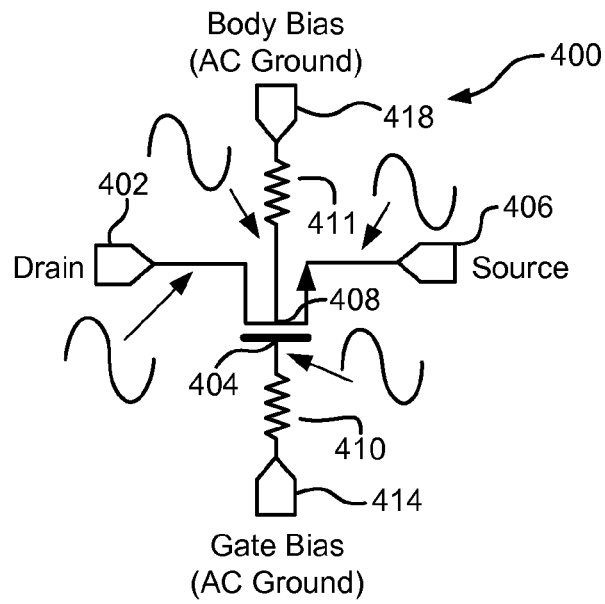
FIG. 4 is an exemplary NMOS switching device in ON mode.

FIG. 4 is an exemplary NMOS switching device 400 in an ON mode. The NMOS switching device 400 includes a drain 402, a gate 404, a source 406 and a body 408, and can include series resistances 410 & 411 in both gate and body connections, respectively. The nodes 414 and 418 can be connected to alternating current (AC) ground. In the ON mode, the NMOS device can have no significant AC signal swing across any of the drain 402, gate 404, source 406 and body 408 nodes. For example, if a large signal is applied to the drain 402, the signal is capacitively coupled to the body 408 and the gate 404.

The drain 402, gate 404, source 406 and body 408 nodes swing together. Therefore, no significant AC voltage swing exists between any two nodes. There may be swing, however, in the OFF state. In other words, the NMOS switching device 400 can act linearly in the ON state but may act non-linearly in an OFF state. Therefore, linearity of a TX/RX switch using NMOS switching devices, such as the first switching device 212 and the second switching device 216, can be limited by the linearity of OFF devices. Linearity of the transceiver switch 210 can be important in the transmit mode but not necessary in the receive mode.

Figure 5:
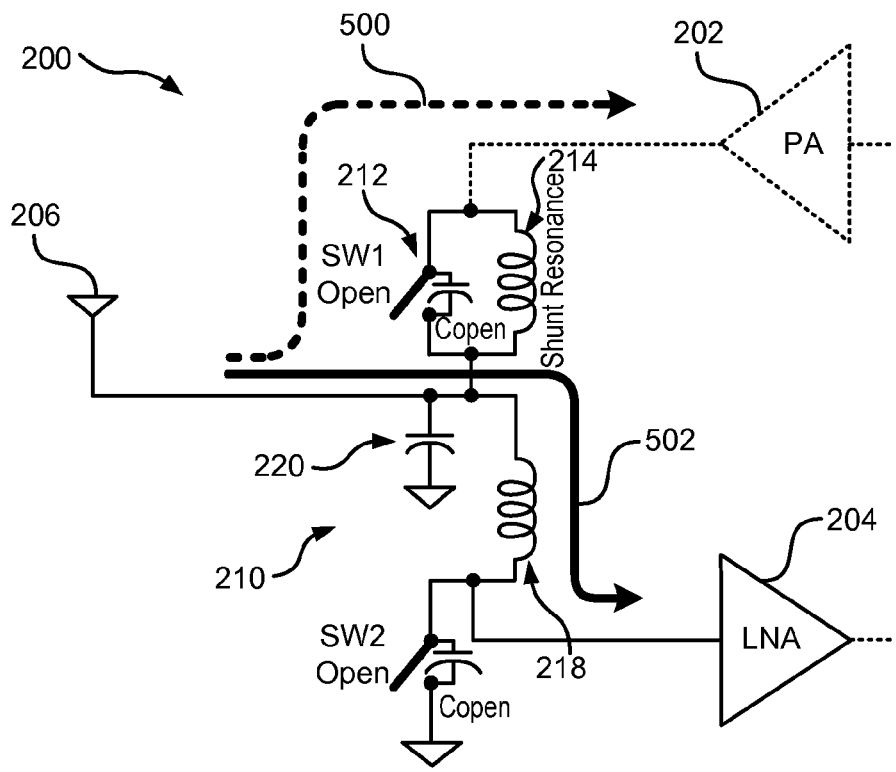
FIG. 5 is a circuit diagram of the exemplary TX/RX transceiver in receive mode.

FIG. 5 is a circuit diagram of the exemplary TX/RX transceiver topology 200 in the receive mode. In the receive mode, the first switching device 212 and the second switching device 216 are in an OFF state. The first inductor 214 is now in shunt resonance with capacitance of the OFF first switching device 212. Therefore, about no antenna signal 500 is lost to the PA 202. The capacitor 220 and series second inductor 418 can provide receive mode impedance matching, e.g., L-network matching in the receiver path 502. With the first switching device 212 and the second switching device 216 open, the LNA 204 can receive a signal 502 from the antenna 206, such as an incoming communication signal for processing.

Figure 6:
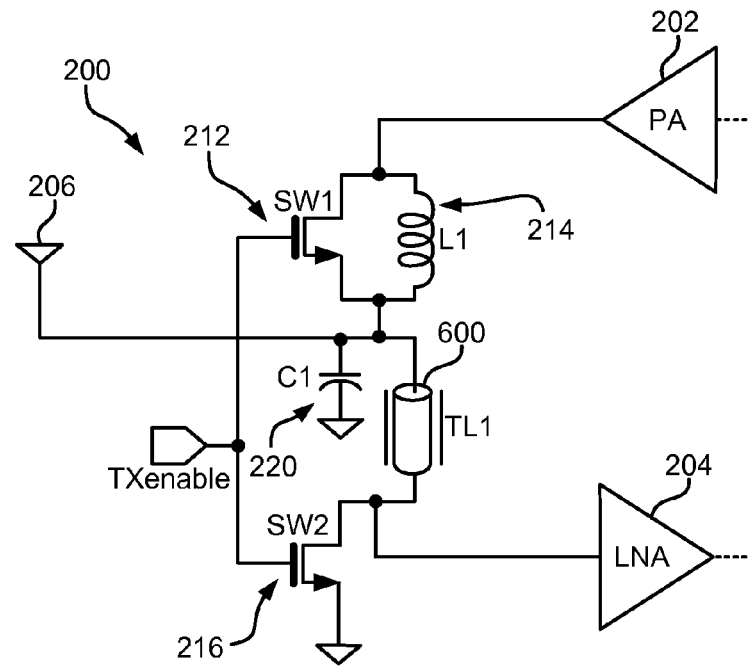
FIG. 6 is a circuit diagram of an exemplary TX/RX transceiver topology with transmission lines replacing lumped passive elements.
Figure 7:
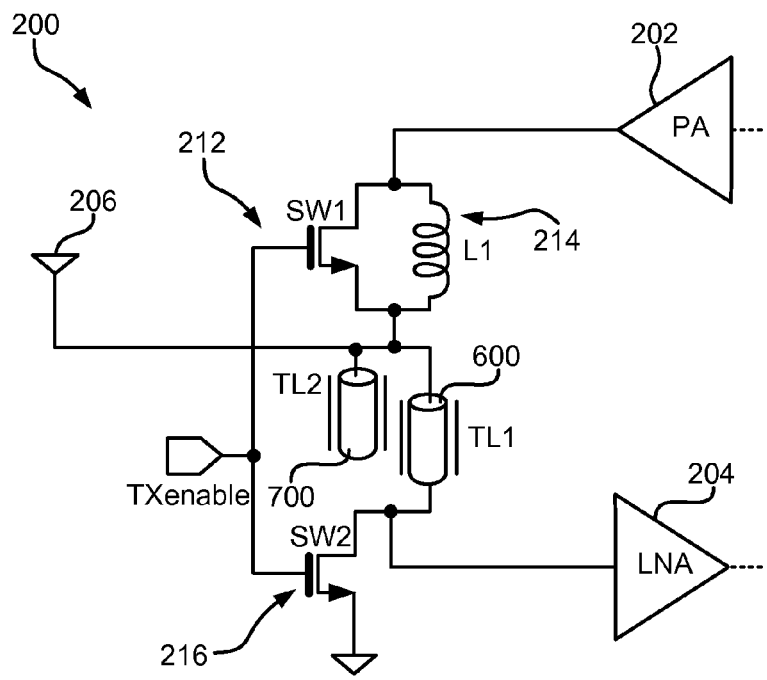
FIG. 7 is a circuit diagram of an exemplary TX/RX transceiver topology with transmission lines replacing lumped passive elements.

FIGS. 6 and 7 are circuit diagrams of exemplary TX/RX transceiver topologies 200 with transmission lines replacing lumped passive elements. Instead of using second inductor 218 as a lumped passive element, for example, inductance can be provided with an integrated circuit transmission line TL1 600. Additionally or alternatively, the capacitors and inductors, e.g., C1, L1 and/or L2, can be replaced with other passive elements. For example, the capacitor 220 can be replaced with transmission line TL2 700 to perform the capacitive functions. The transmission lines may include microstrip, CPW (co-planar waveguide) or other transmission lines constructed of metal layers available in the integrated circuit process technology.

Figure 8:
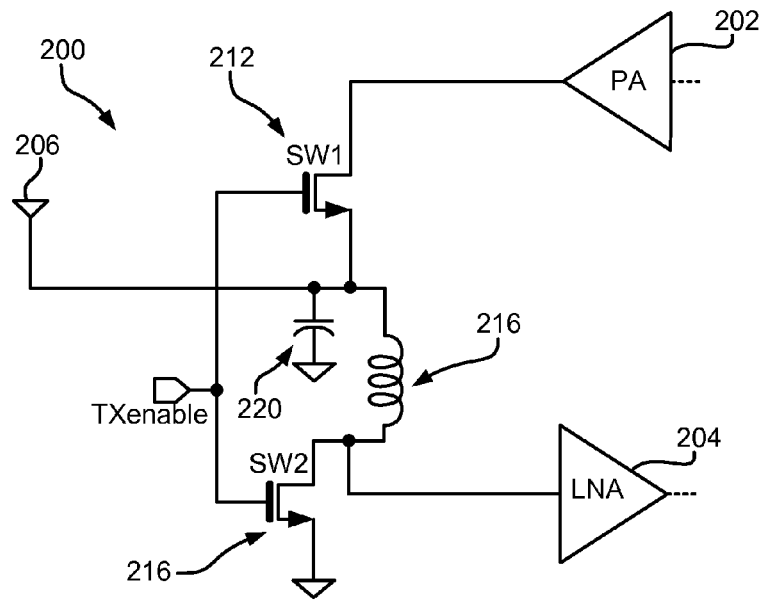
FIG. 8 is a circuit diagram of an exemplary TX/RX transceiver topology without shunt resonance.

FIG. 8 is a circuit diagram of an exemplary TX/RX transceiver topology 200 without shunt resonance in transmit path. The transceiver topology 200 can include the first switching device 212, the second switching device 216, the PA 202 and the LNA 204. In the receive mode, when the first switching device 212 in an OFF state is sufficient to isolate the PA 202 from the other devices, a shunt resonance may not be needed. Therefore, there is no inductor element in parallel with the first switching device 212 in this implementation.

Figure 9:
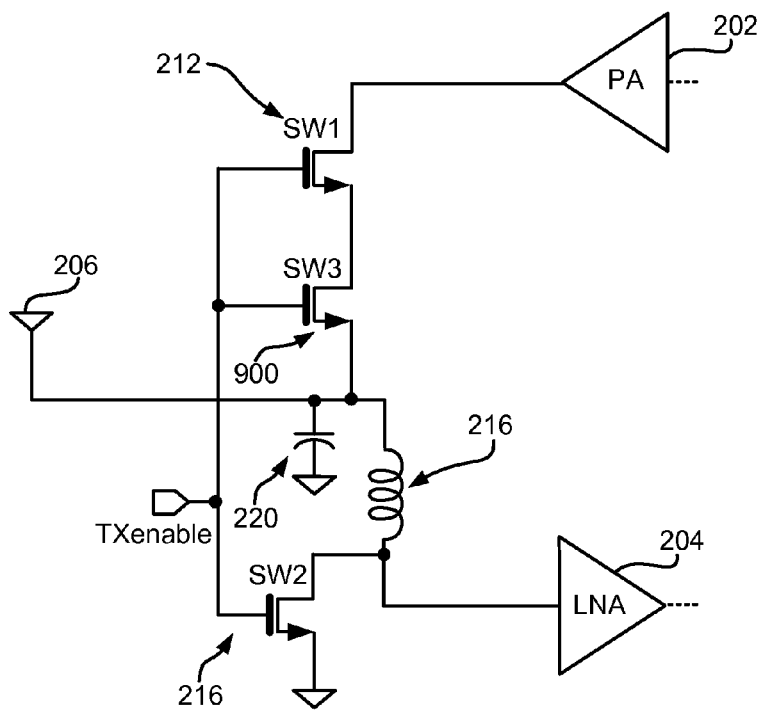
FIG. 9 is a circuit diagram of another exemplary TX/RX transceiver topology without shunt resonance.

FIG. 9 is a circuit diagram of another exemplary TX/RX transceiver topology 200 without shunt resonance. The transceiver topology 200 can include the first switching device 212, the second switching device 216, the PA 202 and the LNA 204. Instead of shunt inductance across the first switching device 212, a third switching device 900 can be placed in series with the first switching device 212 to provide isolation of the PA 202 in the in the receive mode.

Implementing the transmit mode with all switching devices in the ON state can achieve sharing of a transmit/receive antenna, low power loss and high or substantial linearity. Switches implementing this topology can increase the overall output 1-dB compression point of the TX chain. For example, a transmit mode TX/RX switch can provide a 1-dB compression point (oP1 dB) of >30 dBm, with a loss of about 1 dB, where oP1 dB[TX-modeTX/RXsw]>>oP1 dB[TX-chain without TX/RXsw] such that oP1 dB[TX-chain with TX/RXsw]=oP1 dB[TX-chain without TX/RXsw]−Loss [TX-modeTX/RXsw]. Consider a transmitter (TXeg1) having an output P1 dB of 9 dBm without the TX/RX switch. Consider a TX/RX switch (TXRXSWeg1) with 1 dB loss having an output P1 dB of 10 dBm. Consider another TX/RX switch (TXRXSWeg2) with the same 1 dB loss but having an output P1 dB of 30 dBm.

Output $P1$ dB of [$TXeg1+TXRXSWeg1$] is 5.88 dBm.

Output $P1$ dB of [$TXeg1+TXRXSWeg2$] is 7.97 dBm≈ [Output $P1$ dB of $TXeg1$]−[Loss of $TXRXSWeg2$].

In one aspect, the described examples can implement about 60 GHz TX/RX switching in 40 nm low power (LP) complementary-symmetry metal-oxide-semiconductors (CMOS). In other aspects, other operating frequencies and other process technologies can be used. For example, other frequency ranges can include few MHz to several hundreds of GHz. The aspects are also not limited to CMOS switching devices. Other types of switching devices can be used such as those in GaAs, SiGe and other bipolar, BiCMOS and CMOS process technologies.

Figure 10:
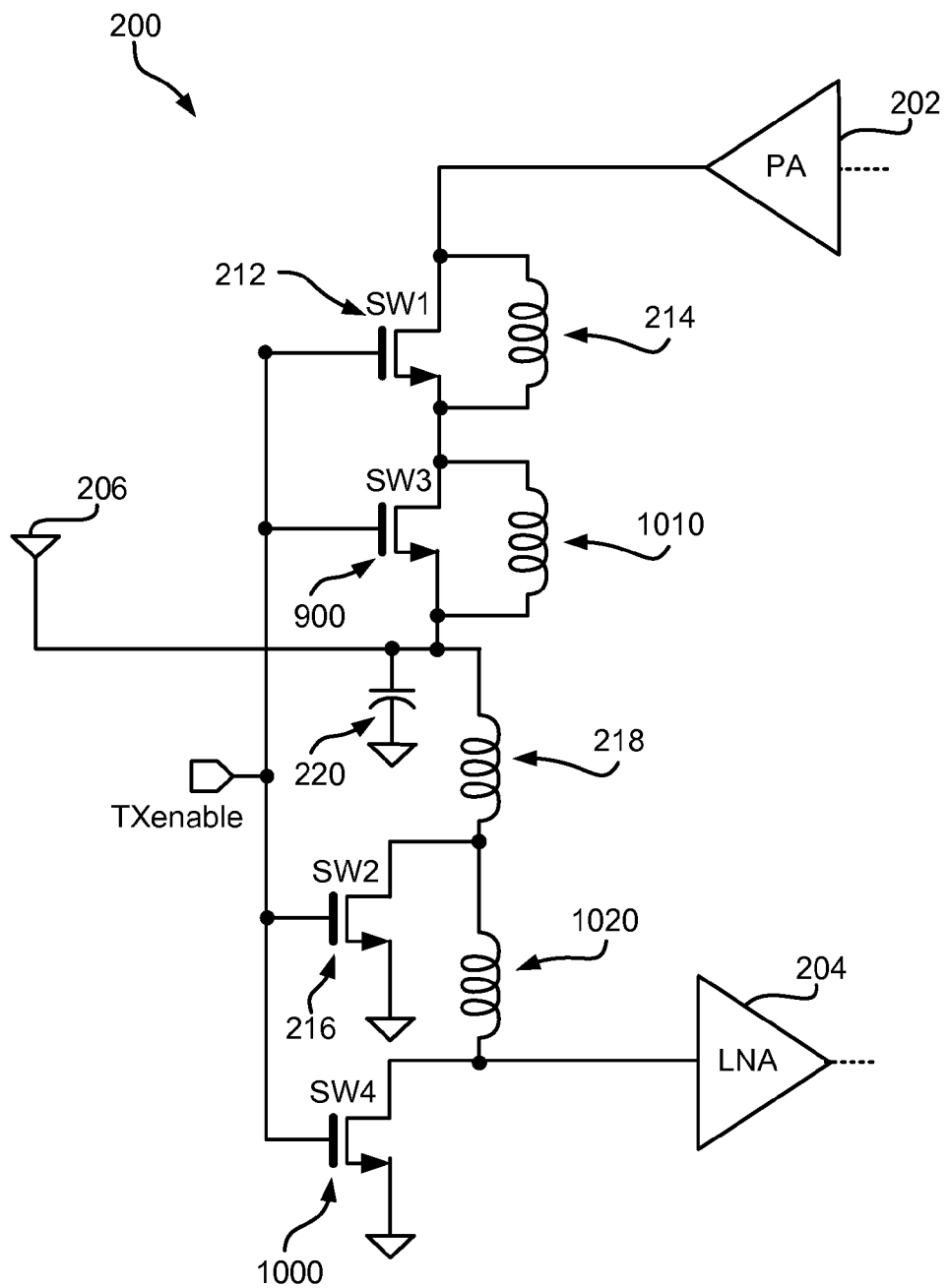
FIG. 10 is a circuit diagram of another exemplary TX/RX transceiver topology with added isolation.

FIG. 10 is a circuit diagram of another exemplary TX/RX transceiver topology 200 with added isolation for lower operating frequencies. In one aspect, more switching devices can be used for more isolation at low frequencies. In receive mode for example, the additional resonant network (switching device 900 in shunt with inductor 1010) in series with the shunt resonant network (of switching device 212 in shunt with inductor 214), ensures even lower signal loss to PA 202 from antenna 206 than if less switching devices were used. Similarly in transmit mode, the additional switching device to ground 1000 and series inductance 1020, ensures even lower signal loss of the transmit output power from the PA 202 to the LNA 204. Alternatively or additionally, more or less switching devices can be used and more or longer transmissions lines can be used, such as in an implementation like FIG. 6 or 7.

While various embodiments have been described, it will be apparent that many more embodiments and implementations are possible within the scope of the invention. Accordingly, the invention is not to be restricted.

What is claimed is:

1. A communication circuit, comprising:
a power amplifier to provide communication signals to an antenna during a transmit mode;
a low noise amplifier including a low noise amplifier input connected with the antenna to receive communication signals;
a first switching device connected in parallel to a first inductor between the power amplifier and the antenna to selectively provide a signal path from the power amplifier to the antenna in transmit mode by bypassing the first inductor; and
a second switching device and a second inductor connected in series between the antenna and ground, the second switching device connected in parallel to the low noise amplifier input to short the low noise amplifier input and the second inductor to ground, where the first and second switching devices are set to an ON state during transmit mode.

2. The communication circuit of claim 1 where no switching device connected with the power amplifier, the low noise amplifier and antenna are set to an OFF state during transmit mode.

3. The communication circuit of claim 1, further including a capacitor connected to ground, the antenna and the first inductor to provide a shunt resonance with the second inductor in transmit mode.

4. The communication circuit of claim 3 where the capacitor further connects to the second inductor to provide an L-network impedance matching in receive mode.

5. The communication circuit of claim 1 where there is no significant alternating current signal swing across any two nodes of the first switching device and the second switching device in the transmit mode.

6. The communication circuit of claim 1 further including a transmission line and a capacitor connected in series with the second switching device and the antenna, the capacitor and the transmission line to provide an L-network impedance matching in receive mode.

7. The communication circuit of claim 1 further including a first transmission line and a second transmission line connected in series with the second switching device and the antenna, the first transmission line and the second transmission line to provide a shunt resonance in transmit mode.

8. The communication circuit of claim 1, further including a third switching device connected with the first switching device, where the first switching device, the second switching device and the third switching device are all set to an ON state in transmit mode.

9. The communication circuit of claim 1, further including a third switching device connected with the first switching device and a fourth switching device connected with the second switching device, where the first switching device, the second switching device, the third switching device and the fourth switching device are all set to an ON state in transmit mode.

\* \* \* \* \*